(12) United States Patent
Zeller et al.

(10) Patent No.: US 6,593,676 B2
(45) Date of Patent: Jul. 15, 2003

(54) GENERATOR ROTOR HAVING AXIAL ZONE BLOCKS AND ASSOCIATED METHODS

(75) Inventors: Larry Zeller, Orlando, FL (US); Kevin Light, Maitland, FL (US); Keith McLaurin, Orlando, FL (US); Rene Echevarria, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 55 days.

(21) Appl. No.: 09/961,869

(22) Filed: Sep. 21, 2001

(65) Prior Publication Data

US 2003/0057801 A1 Mar. 27, 2003

(51) Int. Cl.[7] .................................................. H02K 3/46
(52) U.S. Cl. ...................................................... 310/270
(58) Field of Search .................................. 310/260, 270, 310/261

(56) References Cited

U.S. PATENT DOCUMENTS

| | | | |
|---|---|---|---|
| 4,439,701 A | * 3/1984 | Okamoto et al. | ............. 310/45 |
| 4,469,971 A | 9/1984 | Moore | ......................... 310/214 |
| 4,792,713 A | 12/1988 | Bush | .......................... 310/217 |
| 5,113,114 A | 5/1992 | Shih et al. | .................. 310/270 |
| 5,258,682 A | 11/1993 | Ward et al. | ................. 310/270 |
| 5,483,112 A | 1/1996 | Biseli et al. | .................. 310/61 |

* cited by examiner

Primary Examiner—Nestor Ramirez
Assistant Examiner—Hanh N Nguyen

(57) ABSTRACT

An axial zone block (20) and methods of using the same are provided. The axial zone block (20) preferably is adapted to be positioned to overlie a rotor shaft (18) of a generator rotor (10) and to underlie portions of a plurality of end windings (15) and portions of at least one coil pole cross-over connector (17) of the generator rotor (10) to assist in forming low pressure axial zones in the rotor (10). The axial zone block (20) preferably includes a separate upper block portion (25) adapted to be positioned to underlie and abuttingly contact portions of the at least one coil pole cross-over connector (17) and portions of the plurality of end windings (15), a separate lower inboard block portion (35) adapted to be positioned to underlie and abuttingly contact an inboard end of the upper block portion (25), and a separate lower outboard block portion (45) adapted to be positioned to underlie and abuttingly contact an outboard end of the upper block portion (25) and to be positioned adjacent and abuttingly contact an outboard end of the lower inboard block portion (35).

18 Claims, 5 Drawing Sheets

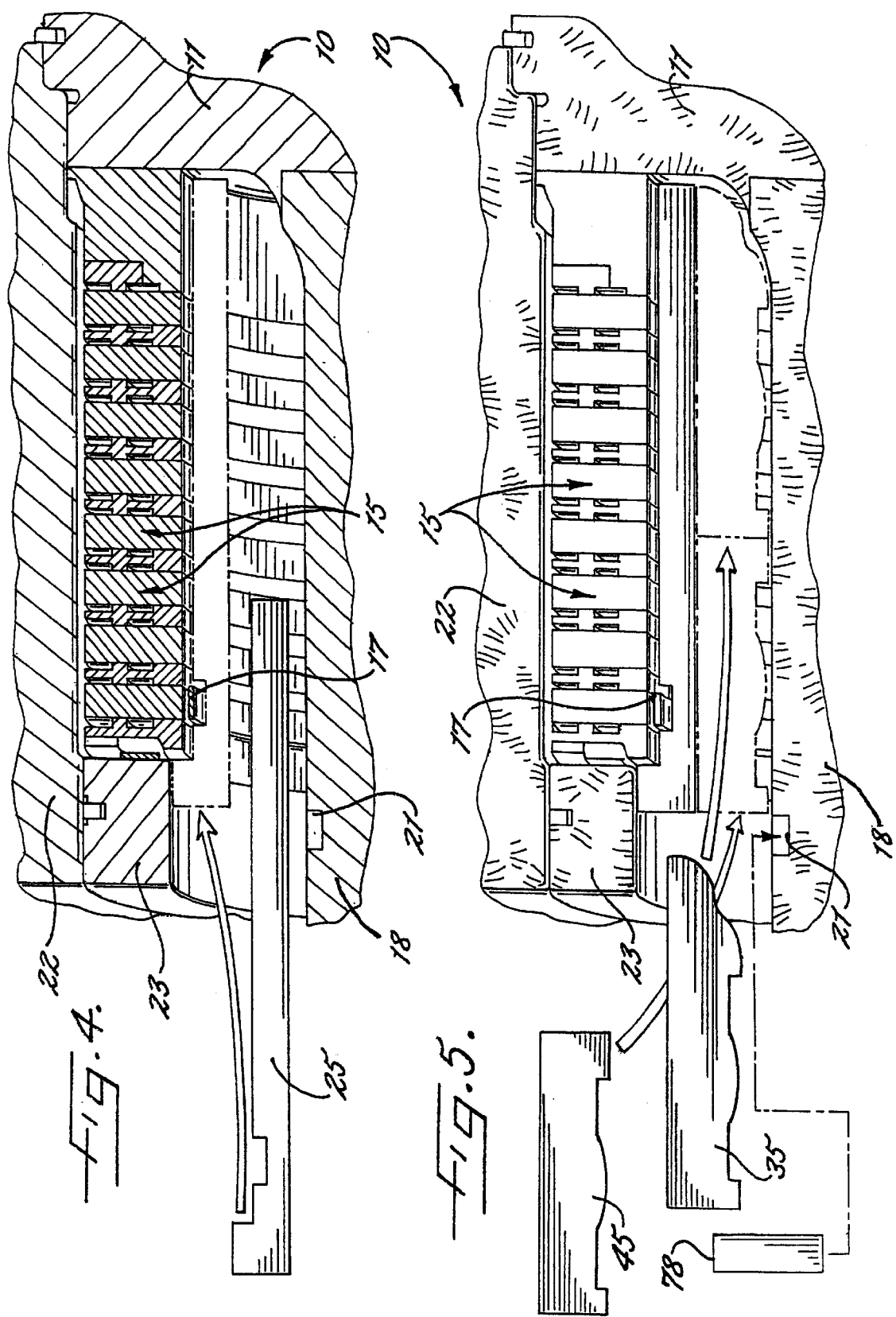

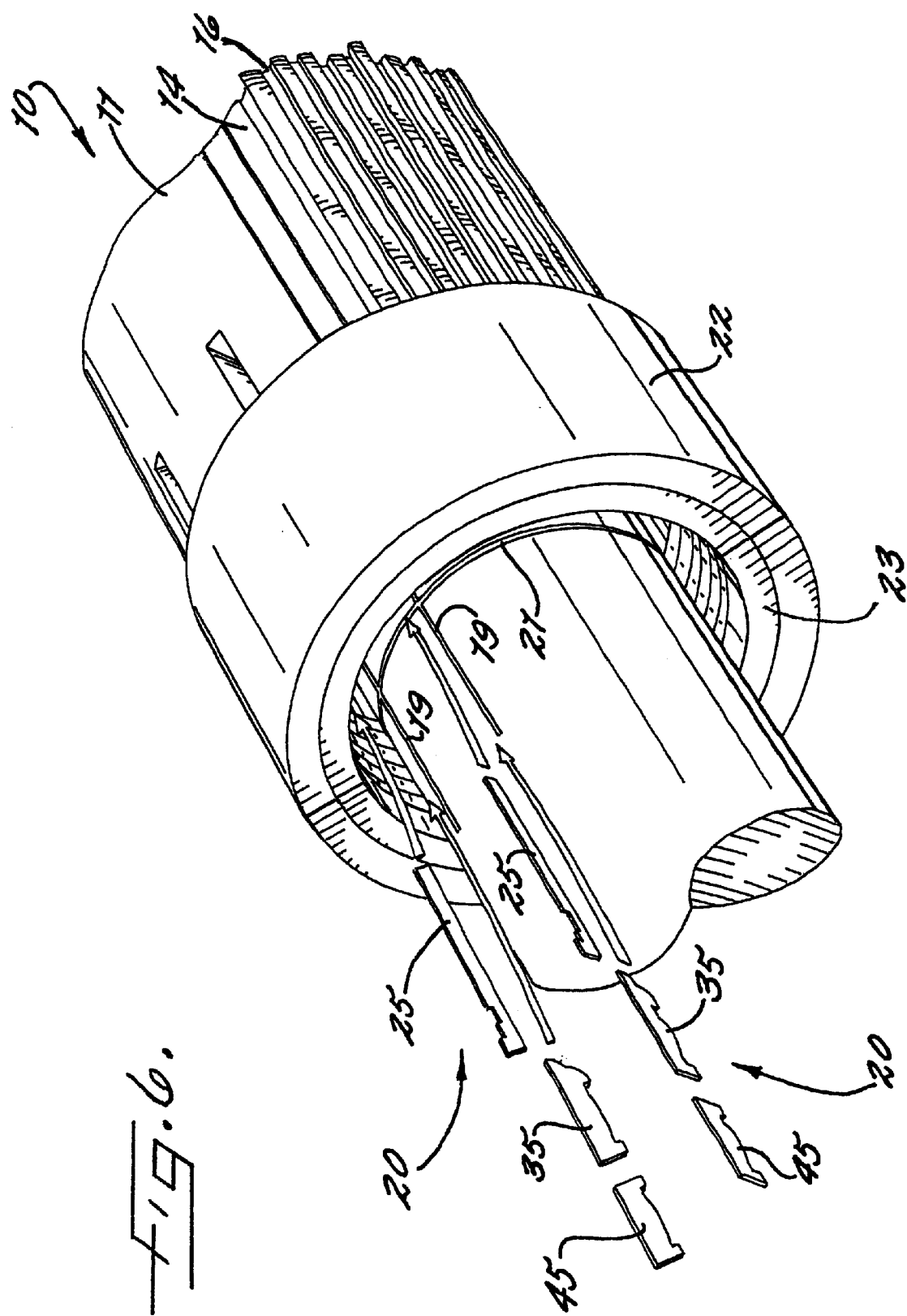

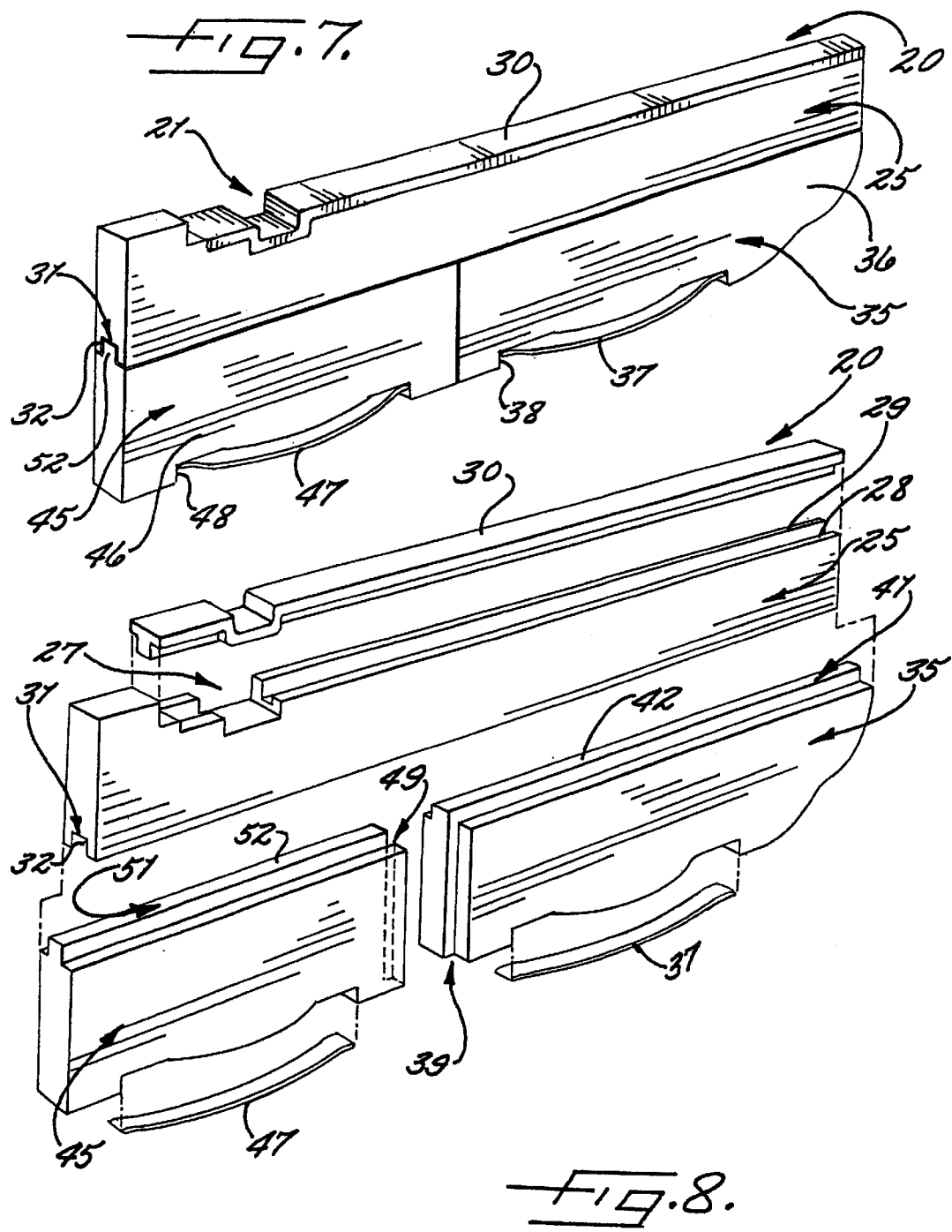

US 6,593,676 B2

GENERATOR ROTOR HAVING AXIAL ZONE BLOCKS AND ASSOCIATED METHODS

FIELD OF THE INVENTION

The present invention relates to the power generation industry and, more particularly, power generator rotors and methods related to generator rotors.

BACKGROUND OF THE INVENTION

In a power generation system, a generator rotor is conventionally positioned within a stator to generate power through magnetic induction as the rotor rotates within the stator. As shown in Prior Art FIGS. 2–3, the rotor 60 has a rotor body 61, e.g., substantially cylindrical in shape, and a rotor shaft 68 extending axially through medial portions of the rotor body 61. The rotor body 61 has a plurality of axially-extending slots 64 formed in the outer peripheries of the rotor body 61 and extending inwardly a preselected depth toward the rotor shaft 68. A plurality of coils 66 is positioned in and extends the length of the slots 64. The coils 66 include end windings 65 or end turns positioned to extend outwardly from the slots 64 along the respective end peripheries of the rotor body 61. In two-pole generator rotors, some of the coils 66 are positioned around a north pole and the remaining are positioned around a south pole. Pole cross-over connectors 67 are positioned to underlie the end windings 65 between the rotor shaft 68 and the inner surface of the end windings 65.

In these type of generator rotors 60, for example, axial zone blocks 70, e.g., a single extended block or an inboard block portion 71 and an outboard block portion 72, are positioned between the outer surface of the rotor shaft 68 and underlying the inner surface of the end windings 65 to create a ventilation barrier such as shown in U.S. Pat. No. 5,483,112 by Biseli et al. titled "Rotor End Turn Ventilation Structure." This ventilation barrier assists in cooling the rotor 60 during operation, e.g., by creating a low pressure zone separate from a high pressure zone as understood by those skilled in the art, and for particularly cooling the rotor coils. With such air cooled rotors 60, for example, the pole cross-over connectors 67 create a step in the coil or copper surface against which the axial zone blocks 70 are sealing. To account for this step, the axial zone blocks 70 have a notch 77 or recess formed in the upper peripheral surface. This creates an assembly problem, especially on the excitation end of the rotor 60, that requires a jack, e.g., mechanical or hydraulic, to be placed under the end windings 65 which are lifted or "jacked up" to provide enough clearance for the axial zone blocks 70 to be inserted. This lifting makes it difficult to install and remove the axial zone blocks 70 after final assembly of the rotor 60 and can cause damage to the end windings 65 which, in turn, hurts performance of the generator rotor 60.

SUMMARY OF THE INVENTION

With the foregoing in mind, the present invention advantageously provides a generator rotor of a power generation system having axial zone blocks and methods of using the same which make the axial zone blocks relatively easy to install and remove. The present invention also advantageously provides axial zone blocks and methods of using the axial zone blocks which substantially reduce damage to the end windings caused by lifting or "jacking up" the end windings during installation or removal. The present invention further advantageously provides axial zone blocks which are compact, are formed of at least three portions, and which readily fit together to define a single block in combination positioned between the outer surface of the rotor shaft and the inner surface of the end windings of a generator rotor.

More particularly, an axial zone block according to the present invention preferably is adapted to be positioned to overlie a rotor shaft of a generator rotor and to underlie portions of a plurality of end windings and portions of at least one coil pole cross-over connector of the generator rotor to assist in forming low pressure axial zones in the rotor. The axial zone block preferably includes a separate upper block portion adapted to be positioned to underlie and abuttingly contact portions of the at least one coil pole cross-over connector and portions of the plurality of end windings, a separate lower inboard block portion adapted to be positioned to underlie and abuttingly contact an inboard end of the upper block portion, and a separate lower outboard block portion adapted to be positioned to underlie and abuttingly contact an outboard end of the upper block portion and to be positioned adjacent and abuttingly contact an outboard end of the lower inboard block portion.

According to another aspect of the present invention, a power generation rotor is provided which preferably includes a rotor body having a plurality of slots formed therein and a plurality of coils each positioned in one of the plurality of slots. The plurality of coils each preferably have a plurality of end windings extending outwardly from the plurality of slots along respective end portions, e.g., turbine and excitation end portions, of the rotor body. The rotor also preferably has a plurality of coil pole cross-over connectors positioned to underlie portions of the plurality of end windings. A rotor shaft is preferably positioned to extend axially through the rotor body and to underlie the plurality of coils, the plurality of end windings, and the plurality of coil pole cross-over connectors. The rotor shaft preferably has a plurality of spaced-apart axially extending grooves formed in an outer surface thereof. A plurality of axial zone blocks is positioned between the rotor shaft and portions of the plurality of end windings and the coil pole cross-over connectors to assist in forming low pressure axial zones in the rotor. Each of the plurality of axial zone blocks preferably includes a separate upper block portion positioned to underlie and abuttingly contact at least one of the plurality of coil pole cross-over connectors and portions of the plurality of end windings. A separate lower inboard block portion is positioned to underlie and abuttingly contact an inboard portion of the upper block portion and positioned within a portion of one of the plurality of axially-extending grooves. A separate lower outboard block portion is positioned to underlie and abuttingly contact an outboard end portion of the upper block portion and abuttingly contact the inboard block portion and positioned within the same one of the plurality of axially-extending grooves as the inboard block portion. Each of the lower inboard and outboard block portions preferably includes a spring to assist in positioning the corresponding inboard and outboard block portions in the one of the plurality of axially-extending grooves and to underlie the upper block portion.

The present invention also advantageously provides a method of using an axial zone block. The method preferably includes inserting an axial zone block having at least three separate block portions between the outer surface of a rotor shaft and an inner surface of portions of a plurality of end windings of coils of a rotor without the need to use a jack to hoist portions of the end windings. The inserting step, for example, preferably and advantageously can include positioning an upper block portion of an axial zone block to underlie portions of the end windings of the plurality of coils and portions of at least one pole cross-over connector, positioning a separate lower inboard block portion of an axial zone block to underlie an inboard end of the upper block portion, and positioning a separate lower outboard block portion of an axial zone block to underlie the outboard end of the upper block portion and to be adjacent an outboard end of the separate inboard block portion.

Therefore, by inserting each axial zone block into position under the end winding and the pole cross-over connectors without the need to jack up or hoist the end windings, the end winding and pole cross-over connectors are not damaged from the hoisting action required by a mechanical or hydraulic jack. These methods and types of axial zone blocks can thereby save time and required components for rotor assembly or disassembly at an installation site and still be installed in a way that protects the overlying end windings and pole cross-over connectors. Hence, the axial zone blocks and methods advantageously make installation and removal much easier and efficient for construction, installation, or service personnel without reducing the effectiveness of the axial zone blocks to accomplish their intended functions.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 4 is a fragmentary sectional view of a generator rotor having axial zone blocks taken along line 4—4 of FIG. 1 according to the present invention;

FIG. 5 is a fragmentary sectional view of a generator rotor showing the installation of axial zone blocks according to the present invention;

FIG. 6 is a fragmentary perspective view of a generator having axial zone blocks according to the present invention;

FIG. 7 is a perspective view of an axial zone block according to the present invention; and FIG. 8 is an exploded perspective view of an axial zone block according to the present invention.

DETAILED DESCRIPTION OF PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
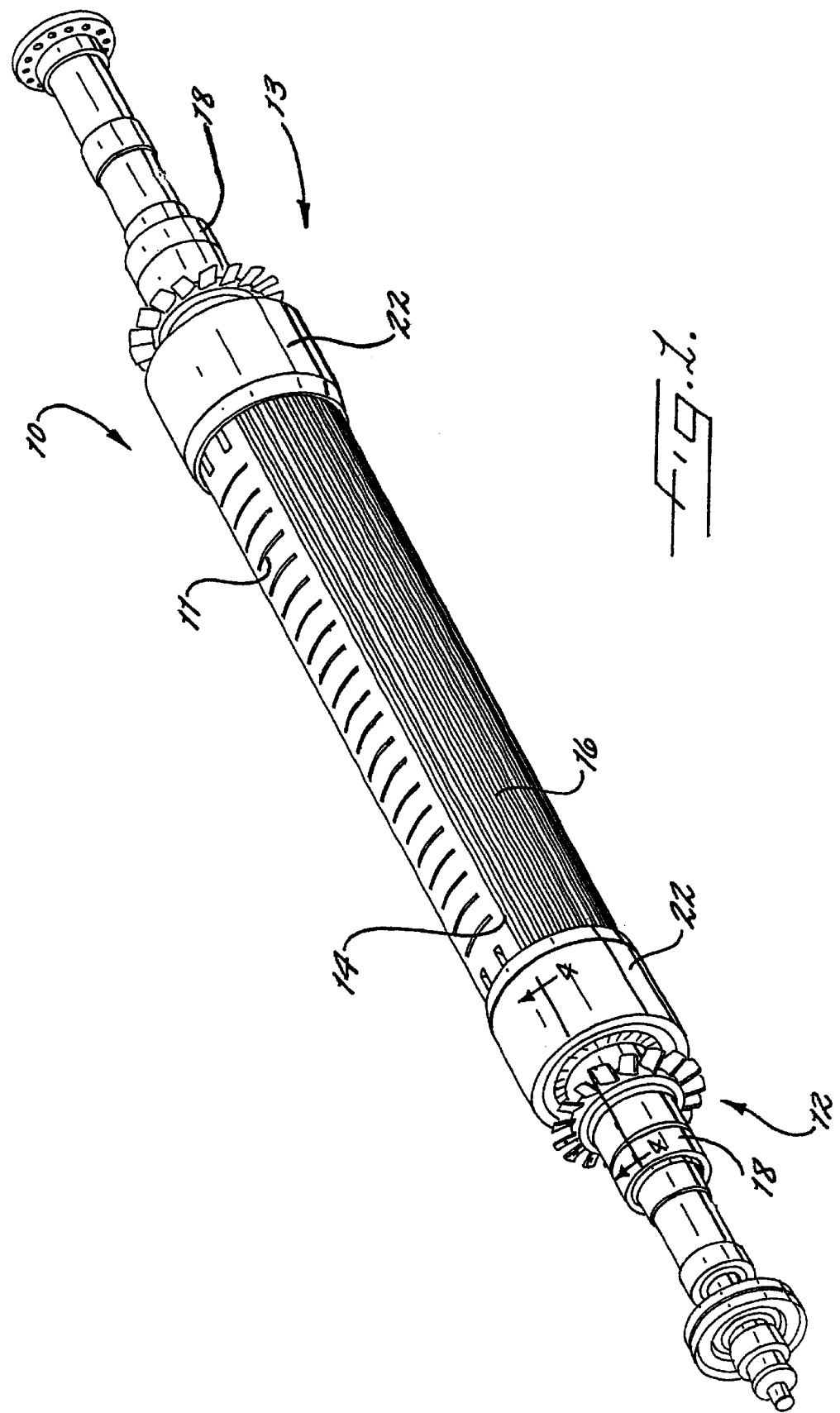
FIG. 1 is a perspective view of a generator rotor of a power generation system having axial zone blocks according to the present invention.
Figure 2:
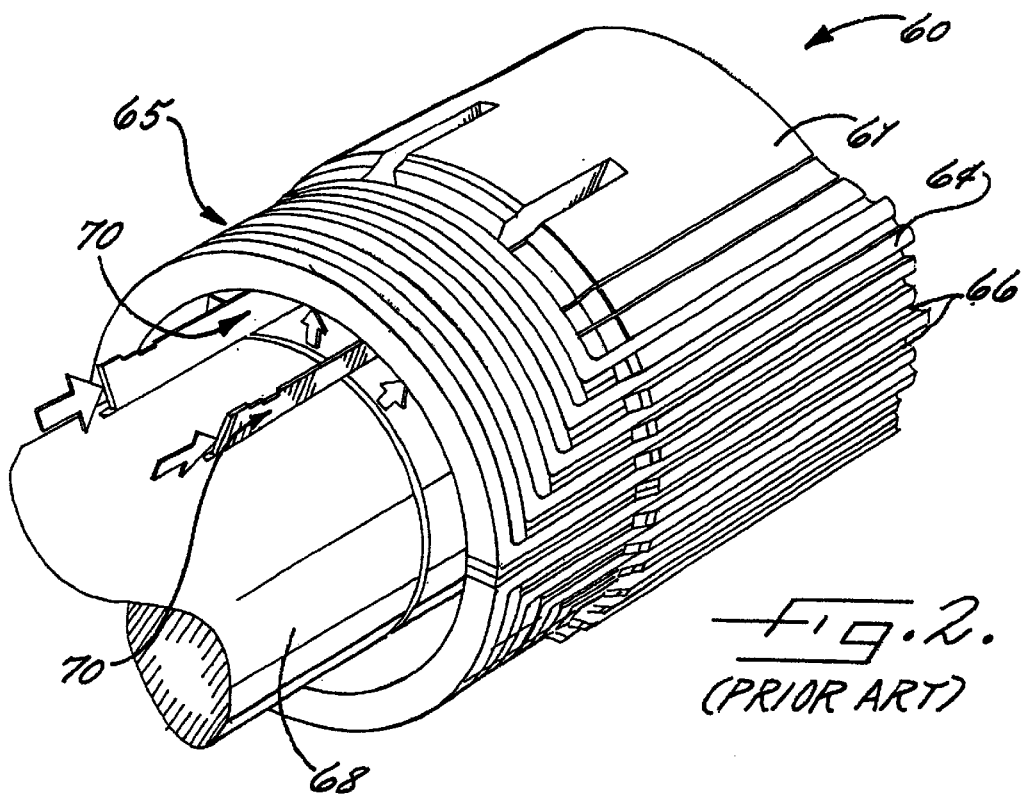
FIG. 2 is a fragmentary perspective view of a generator rotor having axial zone blocks according to the prior art.
Figure 3:
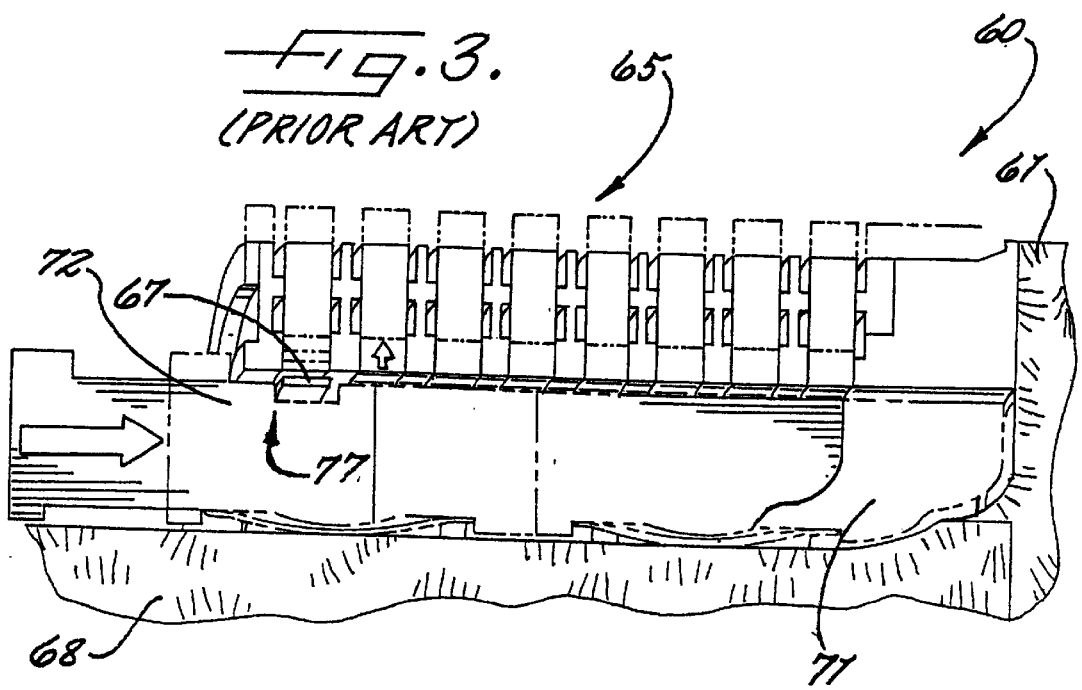
FIG. 3 is a fragmentary sectional view of a generator rotor showing installation of axial zone blocks according to the prior art.

FIGS. 1 and 4–6 illustrate a generator rotor 10 of a power generation system having axial zone blocks 20 according to the present invention. A power generation rotor 10 preferably includes a rotor body 11 having a plurality of slots 14 formed therein and a plurality of coils 16 each positioned in one of the plurality of slots 14. The plurality of coils 16 each preferably have a plurality of end windings 15 extending outwardly from the plurality of slots 14 along respective end portions, e.g., turbine 13 and exciter ends 12, of the rotor body 11. The rotor 10 also preferably has a plurality of coil pole cross-over connectors 17 positioned to underlie portions of the plurality of end windings 15 as understood by those skilled in the art. A rotor shaft 18 is preferably positioned to extend axially through the rotor body 11 and to underlie the plurality of coils 16, the plurality of end windings 15, and the plurality of coil pole cross-over connectors 17. The rotor shaft 18 preferably has a plurality of spaced-apart axially extending grooves 19 formed in an outer surface thereof. A plurality of axial zone blocks 20 is positioned between the rotor shaft 18 and portions of the plurality of end windings 15 and the coil pole cross-over connectors 17 to assist in forming low pressure axial zones in the rotor 10 as understood by those skilled in the art. For example, the axial zone blocks 20 are positioned in spaced-apart pairs preferably underlying one of the poles, i.e., north and south poles, of the rotor 10. Each of the plurality of axial zone blocks 20 is preferably particularly adapted to be positioned to overlie the rotor shaft 18 of the generator rotor 10 and to underlie portions of a plurality of end windings 15 and portions of at least one coil pole cross-over connector 17 of the generator rotor 10 to assist in forming the low pressure axial zones for air cooling the rotor 10.

As perhaps best illustrated in FIGS. 7–8, each of the plurality of axial zone blocks 20 preferably includes a separate upper block portion 25 positioned to underlie and abuttingly contact at least one of the plurality of coil pole cross-over connectors 17 and portions of the plurality of end windings 15, a separate lower inboard block portion 35 positioned to underlie and abuttingly contact an inboard portion of the upper block portion 25 and positioned within a portion of one of the plurality of axially-extending grooves 19, and a separate lower outboard block portion 45 positioned to underlie and abuttingly contact an outboard end or end portion of the upper block portion 25 and abuttingly contact the inboard block portion 35 and positioned within the same one of the plurality of axially-extending grooves 19 as the lower inboard block portion 35. Each of the lower inboard and outboard block portions 35, 45 preferably include a spring 37, 47 to assist in positioning the corresponding inboard and outboard block portions 35, 45 in the one of the plurality of axially-extending grooves 19 and to underlie the upper block portion 25.

The rotor 10 preferably also includes a pair of retaining rings 22, as understood by those skilled in the art, each of which is positioned to overlie and abuttingly contact a respective one set of the plurality of end windings 15 at a respective end 12, 13 of the rotor body 11 to rotationally retain the end windings 15 therein and a pair of end plates 23 each preferably positioned to abuttingly contact an inner surface of a respective one of the pair of retaining rings 22 and the plurality of end windings 15 to axially retain the end windings 15 therein. The rotor shaft 18 further preferably includes a pair of rotationally-extending grooves 21 formed in the rotor shaft and each positioned adjacent a respective one of the end portions 12, 13 of the rotor body 11. The rotor 10 further preferably has a plurality of baffle blocks (not shown) each of which are preferably positioned in one of the rotationally-extending grooves 21, to underlie one of the pair of end plates 23, and abuttingly contact the upper block portion 25 and the outboard block portion 45 of the plurality of axial zone blocks 20.

As also shown in FIGS. 6–8, the upper block portion 25 of each axial zone block 20 preferably includes an upper block body 26 having a pole cross-over notch 27 formed in an upper surface 28 of and extending laterally across the upper block body 26 to underlie the pole cross-over connector 17. A longitudinally extending groove 29 is preferably formed in the upper surface 28 of the upper block body 26 and in the pole cross-over notch 27 as shown. A sealing member 30, e.g., preferably formed of rubber, silicone, or other elastomeric material, is preferably positioned within the longitudinally extending groove 29 and preferably operates as a seal and protective buffer between the upper surface 28 of the upper block body 26 and the overlying portions of the end windings 15 and pole cross-over connector 17. The upper block portion 25 further preferably includes a first block guide 31 associated with the lower end portion of the upper block body 26.

The lower inboard block portion 35 preferably includes an inboard block body 36 having a second block guide 41 associated with the upper end portion of the inboard block body 36 to guide the inboard block portion 35 into position to underlie the inboard end of the upper block portion 25 along the first block guide 31. The lower outboard block portion 45 preferably includes an outboard block body 46 having a third block guide 51 associated with the upper end portion of the outboard block body 46 to guide the lower outboard block portion 45 into position to underlie the outboard end of the upper block portion 25 along the first block guide 31. The first block guide 31 preferably includes a longitudinally-extending first guide groove 32 formed in the lower surface of the upper block body 26. The second block guide 41 also preferably has a longitudinally-extending inboard projection member 42 formed in and extending outwardly from the upper surface of the lower inboard block body 36 and positioned in the first guide groove 32. The third block guide 51 likewise preferably has a longitudinally-extending outboard projection member 52 formed in and extending outwardly from the upper surface of the outboard block body 46 and positioned in the first guide groove 32. Other various types of guide fittings between the block portions 25, 35, 45 can be used as well as understood by those skilled in the art.

Each of the inboard and outboard block bodies 36, 46 preferably also include a spring notch 38, 48 formed in a lower surface of the block body. One of the pair of springs 37, 47, e.g., leaf springs, is positioned within the spring notch 38, 48. The springs are preferably formed of a non-metallic and non-conductive material, such as a reinforced polymer as understood by those skilled in the art, to reduce susceptibility to fatigue and related damage in the system. The inboard block body 36 further preferably includes a first lower block guide 39 positioned along an outboard end of the inboard block body 36, and the outboard block body 46 further includes a second lower block guide 49 positioned along an inboard end of the outboard block body 46 to guide the lower outboard block portion 45 into contact with the lower inboard block portion 35 along the first lower block guide 39. The first lower block guide 39 preferably is a substantially vertical-extending groove formed in the outboard end of the inboard block body 36, and the second lower block guide 49 preferably is a substantially vertical-extending projection member formed in the inboard end of the outboard block body 46 and adapted to be positioned in the vertical-extending groove of the inboard block body 36.

As illustrated in FIGS. 1 and 4–8 and as described above, the present invention also include methods of using one or more axial zone blocks 20. A method of using an axial zone block 20 preferably includes inserting an axial zone block 20 having at least three separate block portions 25, 35, 45 between the outer surface of a rotor shaft 18 and an inner surface of portions of a plurality of end windings 15 of coils 16 of a rotor 10 without the need to use a jack to hoist portions of the end windings 15. The inserting step, for example, preferably and advantageously includes positioning an upper block portion 25 of an axial zone block 20 to underlie portions of the end windings 15 of the plurality of coils 16 and portions of at least one pole cross-over connector 17, positioning a separate lower inboard block portion 35 of an axial zone block 20 to underlie an inboard end of the upper block portion 25, and positioning a separate lower outboard block portion 45 of an axial zone block 20 to underlie the outboard end of the upper block portion 25 and to be adjacent an outboard end of the separate lower inboard block portion 35.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. An axial zone block adapted to be positioned to overlie a rotor shaft of a generator rotor and to underlie portions of a plurality of end windings and portions of at least one coil pole cross-over connector of the generator rotor to assist in forming low pressure axial zones in the rotor, the axial zone block comprising:

a separate upper block portion adapted to be positioned to underlie and abuttingly contact portions of the at least one coil pole cross-over connector and portions of the plurality of end windings;

a separate lower inboard block portion adapted to be positioned to underlie and abuttingly contact an inboard end of the upper block portion; and a separate lower outboard block portion adapted to be positioned to underlie and abuttingly contact an outboard end of the upper block portion and to be positioned adjacent and abuttingly contact an outboard end of the lower inboard block portion.

2. An axial zone block as defined in claim 1, wherein each of the inboard and outboard block portions include a spring adapted to assist in positioning the corresponding lower inboard and outboard block portions to underlie the upper block portion when positioned to underlie portions of the at least one pole cross-over connector and portions of the plurality of end windings.

3. An axial zone block as defined in claim 2, wherein the rotor shaft includes at least one axially-extending groove, and wherein each of the lower inboard and outboard block portion are adapted to be positioned to underlie the upper block portion and to be positioned in the at least one axially-extending groove.

4. An axial zone block as defined in claim 2, wherein the upper block portion includes an upper block body having a pole cross-over notch formed in an upper surface of and extending laterally across the upper block body and adapted to underlie and abuttingly contact the at least one pole cross-over connector, a longitudinally extending groove formed in the upper surface of the upper block body and in the pole cross-over notch, and a sealing member positioned within the longitudinally extending groove of the upper block body.

5. An axial zone block as defined in claim 4, wherein the upper block portion further includes a first block guide associated with the lower end portion of the upper block portion body, wherein the lower inboard block portion includes an inboard block body having a second block guide associated with the upper end portion of the inboard block body to guide the inboard block portion into position to underlie the inboard end of the upper block portion along the first block guide, and wherein the lower outboard block portion includes an outboard block body having a third block guide associated with the upper end portion of the outboard block body to guide the outboard block portion into position to underlie the outboard end of the upper block portion along the first block guide.

6. An axial zone block as defined in claim 5, wherein the first block guide comprises a longitudinally-extending first guide groove formed in the lower surface of the upper block body, wherein the second block guide comprises a longitudinally-extending inboard projection member formed in and extending outwardly from the upper surface of the inboard block body and positioned in the first guide groove, and wherein the third block guide comprises a longitudinally-extending outboard projection member formed in and extending outwardly from the upper surface of the outboard block body and positioned in the first guide groove.

7. An axial zone block as defined in claim 6, wherein each of the inboard and outboard block bodies include a spring notch formed in a lower surface of each of the inboard and outboard block bodies, and wherein one of the pair of springs is positioned within a respective one of the spring notches.

8. An axial zone block as defined in claim 7, wherein the inboard block body further includes a first lower block guide positioned along an outboard end of the inboard block body, and wherein the outboard block body further includes a second lower block guide positioned along an inboard end of the outboard block body to guide the outboard block portion into contact with the inboard block portion along the first lower block guide.

9. An axial zone block as defined in claim 8, wherein the first lower block guide comprises a substantially vertical-extending groove formed in the outboard end of the inboard block body, and wherein the second lower block guide comprises a substantially vertical-extending projection member formed in the inboard end of the outboard block body and positioned in the vertical-extending groove of the inboard block body.

10. A power generation rotor comprising:
a rotor body having a plurality of slots formed therein;
a plurality of coils each positioned in one of the plurality of slots, the plurality of coils each including a plurality of end windings extending outwardly from the plurality of slots along respective end portions of the rotor body, and a plurality of coil pole cross-over connectors positioned to underlie portions of the plurality of end windings;
a rotor shaft positioned to extend axially through the rotor body and to underlie the plurality of coils, the plurality of end windings, and the plurality of coil pole cross-over connectors, the rotor shaft including a plurality of spaced-apart axially extending grooves formed in an outer surface thereof;
a plurality of axial zone blocks each positioned between the rotor shaft and portions of the plurality of end windings and the coil pole cross-over connectors to assist in forming low pressure axial zones in the rotor, each of the plurality of axial zone blocks including a separate upper block portion positioned to underlie and abuttingly contact at least one of the plurality of coil pole cross-over connectors and portions of the plurality of end windings, a separate lower inboard block portion positioned to underlie and abuttingly contact an inboard portion of the upper block portion and positioned within a portion of one of the plurality of axially-extending grooves, and a separate lower outboard block portion positioned to underlie and abuttingly contact an outboard end portion of the upper block portion and abuttingly contact the inboard block portion and positioned within the same one of the plurality of axially-extending grooves as the inboard block portion, each of the lower inboard and outboard block portions including a spring to assist in positioning the corresponding inboard and outboard block portions in the one of the plurality of axially-extending grooves and to underlie the upper block portion.

11. A rotor as defined in claim 10, further comprising a pair of retaining rings each positioned to overlie and abuttingly contact a respective one set of the plurality of end windings at the respective ends of the rotor body to rotationally retain the end windings therein and a pair of end plates each positioned to abuttingly contact a respective one of the pair of retaining rings and the plurality of end windings to axially retain the end windings therein.

12. A rotor as defined in claim 11, wherein the rotor shaft further includes a pair of rotationally-extending grooves formed in the rotor shaft and each positioned adjacent a respective one of the end portions of the rotor body, and the rotor further comprising at least one baffle block, positioned in each of the pair of rotationally-extending grooves and to underlie one of the pair of end plates and abuttingly contact the upper block portion and the outboard block portion of the plurality of axial zone blocks.

13. A rotor as defined in claim 10, wherein the upper block portion includes an upper block body having a pole cross-over notch formed in an upper surface of and extending laterally across the upper block body to underlie and abuttingly contact the pole cross-over connector, a longitudinally extending groove formed in the upper surface of the upper block body and in the pole cross-over notch, and a sealing member positioned within the longitudinally extending groove of the upper block body.

14. A rotor as defined in claim 13, wherein the upper block portion further includes a first block guide associated with the lower end portion of the upper block body, wherein the lower inboard block portion includes an inboard block body having a second block guide associated with the upper end portion of the inboard block body to guide the inboard block portion into position to underlie the inboard end of the upper block portion along the first block guide, and wherein the lower outboard block portion includes an outboard block body having a third block guide associated with the upper end portion of the outboard block body to guide the outboard block portion into position to underlie the outboard end of the upper block portion along the first block guide.

15. A rotor as defined in claim 14, wherein the first block guide comprises a longitudinally-extending first guide groove formed in the lower surface of the upper block body, wherein the second block guide comprises a longitudinally-extending inboard projection member formed in and extending outwardly from the upper surface of the inboard block body and positioned in the first guide groove, and wherein the third block guide comprises a longitudinally-extending outboard projection member formed in and extending outwardly from the upper surface of the outboard block body and positioned in the first guide groove.

16. A rotor as defined in claim 15, wherein each of the inboard and outboard block bodies include a spring notch formed in a lower surface of each of the inboard block and outboard block bodies, and wherein one of the pair of springs is positioned within a respective one of the spring notches.

17. A rotor as defined in claim 16, wherein the inboard block body further includes a first lower block guide positioned along an outboard end of the inboard block body, and wherein the outboard block body further includes a second lower block guide positioned along an inboard end of the outboard block body to guide the outboard block portion into contact with the inboard block portion along the first lower block guide.

18. A rotor as defined in claim 17, wherein the first lower block guide comprises a substantially vertical-extending groove formed in the outboard end of the inboard block body, and wherein the second lower block guide comprises a substantially vertical-extending projection member formed in the inboard end of the outboard block body and positioned in the vertical-extending groove of the inboard block body.

* * * * *